Sept. 18, 1962  H. BAUER  3,054,648
SLIDING ROLLER BEARING
Filed Aug. 31, 1961  3 Sheets-Sheet 1
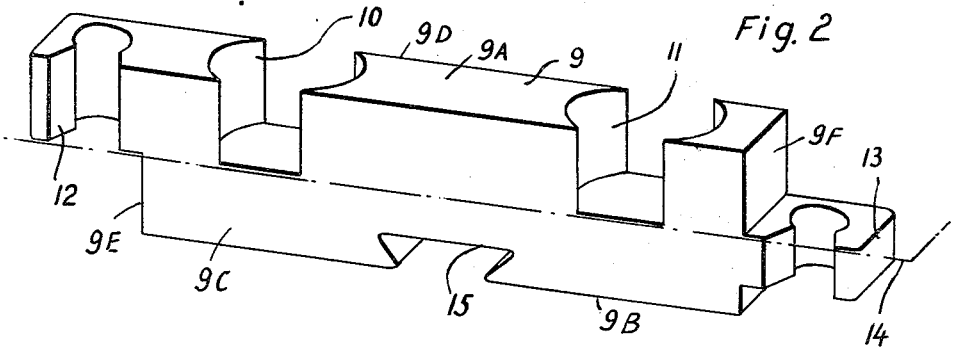
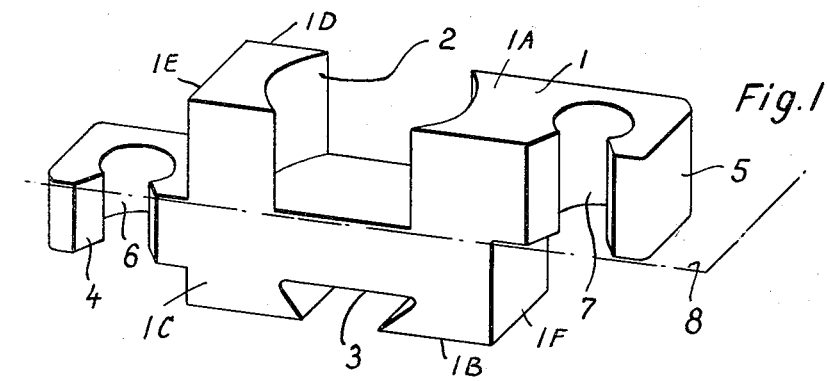
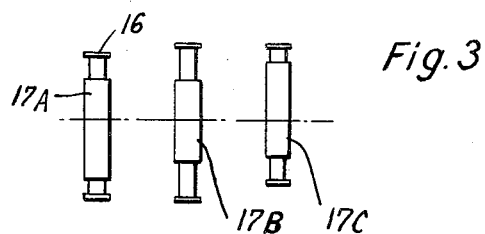
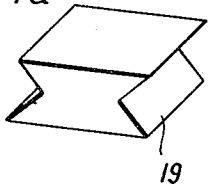
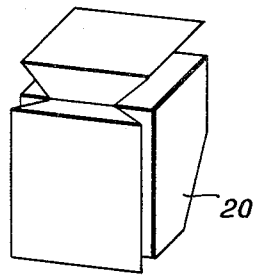
INVENTOR
HORST BAUER
Toulmin & Toulmin

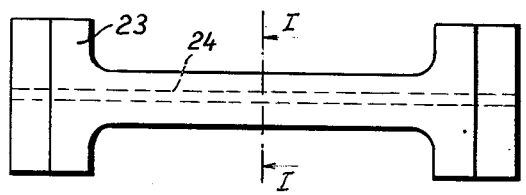
Fig. 5a
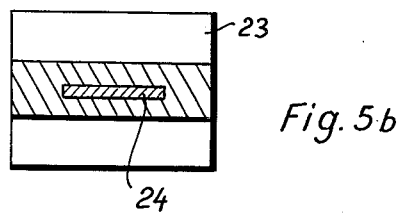
Fig. 5b
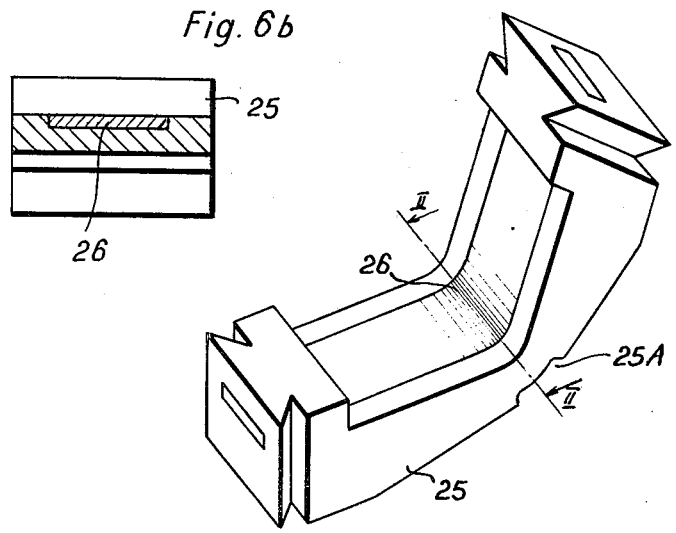
Fig. 6b
Fig. 6a

Sept. 18, 1962     H. BAUER     3,054,648
SLIDING ROLLER BEARING

Filed Aug. 31, 1961     3 Sheets-Sheet 3

INVENTOR

HORST BAUER

Toulmin & Toulmin

United States Patent Office 3,054,648
Patented Sept. 18, 1962

3,054,648
SLIDING ROLLER BEARING
Horst Bauer, Oberbiel, Kreis, Wetzlar, Germany, assignor to Firma Robert Kling Wetzlar Gesellschaft mit beschrankter Haftung, Oberbiel, Kreis, Wetzlar, Germany
Filed Aug. 31, 1961, Ser. No. 135,258
6 Claims. (Cl. 308—6)

The present invention relates to antifriction roller bearings adapted for sliding applications, more particularly, to a sliding roller bearing structure which is fabricated of a number of components so that the assembled roller bearing can be readily assembled in a variety of sizes and shapes.

Sliding bearings have been made in many forms with one form comprising antifriction roller bearings. In general, sliding bearings have been specially constructed for the particular application in which they are to be used. This application of the sliding bearing would determine its length and width.

It has been generally proposed to fabricate sliding roller bearings in such a manner that various lengths can be cut off an extremely long length for use in different applications.

It has also been proposed to manufacture roller bearings from components which can be secured together and which support the roller bearings.

It is therefore the principal object of this invention to provide a novel and improved sliding roller bearing assembly.

It is another object of this invention to provide a roller bearing assembled from a plurality of components so that the ultimate roller bearing can have any desired length and a variety of shapes.

It is a further object of this invention to provide a sliding roller bearing which can be assembled by the usher dependent upon his particular application.

The present invention comprises a plurality of pairs of bearing cages which are interconnected together to form a roller bearing of a particular length and shape. The bearing cages are all similar and each comprises a body having a recess on one side edge for receiving one end of the roller. A tab or lug extends longitudinally from each end of the cage body. The tab on one end is positioned on one side of a plane passing along the longitudinal axis of the body and the tab on the other end is positioned on the other side of this plane. Each of the tabs has a bore therein for receiving the ends of connecting pins. These bores are open on their sides so that the connecting pins can be readily slipped into these bores.

In addition, each of the cage bodies has a dovetail-shaped recess on its side edge opposite to said recess for receiving the roller. Connecting links having double dovetail-shaped projections are used to connect pairs of cages in lateral position with respect to each other.

These connecting links can be made straight so that the laterally positioned pairs of cages are in the same plane, or the links may be made at an angle so that the rollers of the laterally positioned pairs of cages are at angles to each other.

Further, the connecting link can be made of a bendable material so as to be bent to any desired angle.

All of the structural components of the roller bearing of this invention can be fabricated either from metal or plastic. When the bearing is assembled it is possible to combine both plastic and metallic components.

Other objects and advantages of this invention will become apparent upon reference to the accompanying description when taken in conjunction with the following drawings, wherein FIGURE 1 is a perspective view of a roller bearing cage according to the present invention;

FIGURE 2 is a perspective view of a modified cage wherein recesses are provided for a plurality of rollers;

FIGURE 3 shows in plan view three different embodiments of connecting pins used in the present invention;

Figure 7:
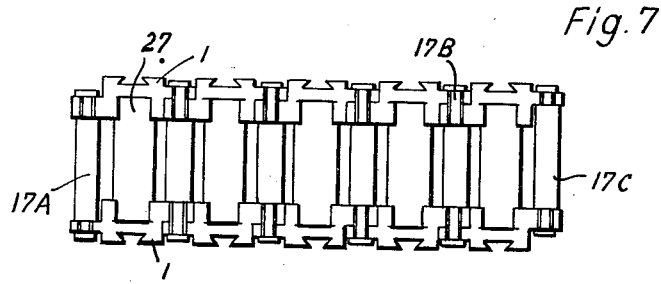
Figure 8:
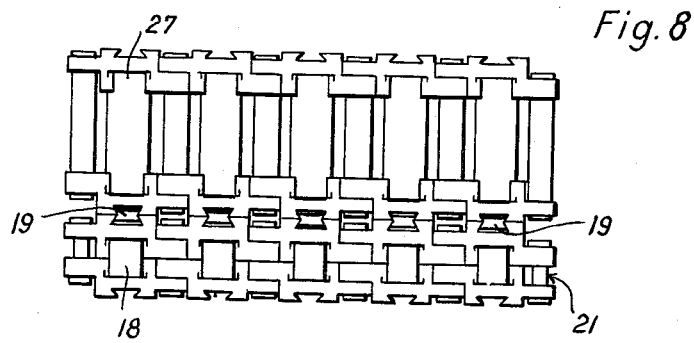
Figure 9:
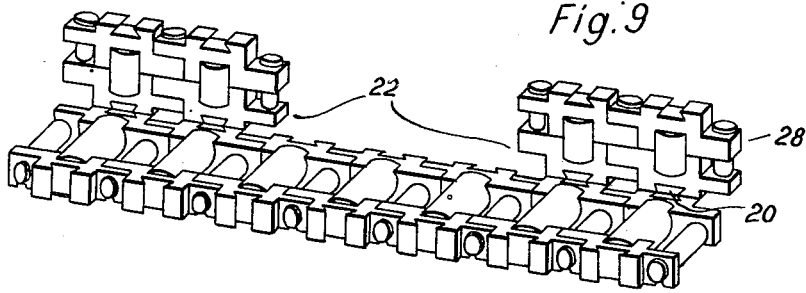

FIGURE 4a shown a connecting link in the form of a double dovetail;

FIGURE 4b is a connecting link having dovetails arranged at right angles to each other;

FIGURE 5a is a side elevational view of a bendable connecting link;

FIGURE 5b is tranverse sectional view of the connecting link shown in FIGURE 5a and taken along the lines I—I;

FIGURE 6a is a perspective view of anoother embodiment of a bendable connecting link;

FIGURE 6b is a tranverse sectional view of the link illustrated in FIGURE 6a and taken along the line II—II;

FIGURE 7 is a plan view of an assembled sliding roller bearing;

FIGURE 8 is a plan view of a sliding roller bearing assembled from two sliding roller bearings of different widths; and FIGURE 9 is a perspective view of a sliding roller bearing for use on angular bearing surfaces.

Returning now to the drawings, wherein like reference symbols indicate the same parts throughout the various views, there is shown in FIGURE 1 a roller bearing cage comprising a body 1. The body 1 comprises side edges 1A and 1B, faces 1C and 1D and ends 1E and 1F. There is a recess 2 in the side edge 1A which recess opens onto the faces 1C and 1D. There is a dove-tailed groove 3 in the side edge 1B extending through the body 1 to open on both the faces 1C and 1D.

Tabs or lugs 4 and 5 are mounted on the ends 1E and 1F, respectively, of the cage body 1. These lugs have bores 6 and 7 passing transversely therethrough and having passages connecting the bores 6 and 7 with the face 1C of the cage body. The lug 5 is positioned on one side of a horizontal plane passing through the longitudinal axis of the body and indicated at 8. The lug 4 is located on the other side of this plane.

In FIGURE 2 the body illustrated therein is indicated at 9 and is similar to body 1 except that it has two recesses 10 and 11 in a side edge for receiving the ends of rollers. The body 9 similarly comprises longitudinally extending lugs 12 and 13 on the ends thereof. Similarly, these lugs are disposed at opposite sides of a longitudinally extending plane, indicated at 14. There is a dovetail-shaped groove 15 in the other side edge of the body 9.

It is pointed out that the relative position of the lugs 12 and 13 is opposite to that of the lugs 4 and 5 in the embodiment of FIGURE 1. However, in each embodiment the basic arrangement is the same, namely, the lugs on the ends of the body are on opposite sides of a plane passing through the longitudinal axis of the body.

Proceeding next to FIGURE 3 there are illustrated three forms of connecting pins 17A, 17B and 17C, each of which has heads 16 on both ends thereof. Pins 17A and 17C are used solely for the bores at the ends of the assembled roller bearing such as may be seen in FIGURE 7. Connecting pin 17B is used for all the intermediate bores such as is also illustrated in FIGURE 7.

A connecting link 19 is illustrated in FIGURE 4a. This link is in the shape of a double dovetail with the dovetails formed to fit into the grooves 3 and 15.

A modified connecting link 20 is illustrated in FIGURE 4b. The connecting link 20 has two dovetail-shaped projections which are at right angles to each other.

In FIGURE 5a there is illustrated a connecting link 23 which can be bendable to a variety of positions. The connecting link 23 similarly has dovetail projections on the ends thereof and is formed of a plastic. A metal strip 24 extends longitudinally through the connecting link 23, as shown in FIGURES 5a and 5b. The strip 24 is made of such a metallic material that it can be bent into various shapes and retains this bent position.

In FIGURES 6a and 6b there is illustrated another form of a bendable connecting link wherein a link, indicated at 25, has a bendable metallic strip 26 mounted on one of its longitudinal surfaces.

Proceeding next to FIGURE 7 there is shown an assembled roller bearing. It can be seen that the assembled bearing comprises a plurality of pairs of bearing cages 1. Rollers 27 have their ends inserted in opposed recesses 2 of each pair of cages. The end lugs of the plurality of pairs of cages are connected by connecting pins 17A and 17C. The intermediate lugs of the pairs of cages are interconnected by connecting pins 17B which are slipped into the bores 7 of the first pair of cages and the bores 6 of the second pair of cages. In this manner the two pairs of cages are interconnected. Similarly, all of the cages are interconnected to form the sliding roller bearing assembly as shown in FIGURE 7.

In FIGURE 8 there is shown a roller bearing assembly wherein rolls of two different lengths are used. The roll 27 used in FIGURE 7 and a roll 18 is used in this bearing assembly. The two bearing assemblies of different widths are joined by connecting links 19. In the lower bearing assembly as viewed in FIGURE 8 and indicated at 21 the bearing cage bodies have recesses 2 which are of such a depth to accommodate rollers 18 which are substantially square in longitudinal section.

FIGURE 9 illustrates an angular sliding roller bearing assembly wherein two roller bearings are interconnected by connecting links 20. The roller bearing assembly indicated at 28 is interrupted at 22 in order to accommodate a structural component which is to be supported only at its ends.

In a manner similar to the assembly of FIGURE 9 a plurality of roller bearings can be connected, using the bendable connecting links 23 and 25 described previously. These connecting links can be bent to approximately the angle between the bearing surfaces and the links will then adapt themselves to the correct angle of the bearing surfaces when the angular roller bearing assembly is installed.

Thus it can be seen that the present invention provides a simple yet effective structure whereby the user of sliding roller bearings can readily assemble a roller bearing to a particular length and width. In addition, the roller bearing can can be assembled to fit on angular surfaces. Since the tabs or lugs on the ends of each of the cage bodies are equal and are square, the assembled roller bearing will be substantially rigid.

It will be understood that this invention is susceptible to modification in order to adapt it to different usages and conditions and, accordingly, it is desired to comprehend such modifications within this invention as may fall within the scope of the appended claims.

What is claimed as this invention is:

1. A roller bearing cage comprising a body, there being a recess in one side edge of said body for receiving an end of a roller, longitudinally extending tabs on the ends of said body with the tab on one end being on one side of a horizontal plane passing through the longitudinal axis of the body and the tab on the other end of the body being on the other side of said plane, there being transversely extending bores through said tabs for receiving connecting pins therein, there being passages in said tubes interconnecting each of said bores with a face of said body so that connecting pins can be slipped into said bores through said passages.

2. A roller bearing cage comprising a body, there being a recess in one side edge of said body for receiving an end of a roller, there being a groove in the other side edge of said body and tapering inwardly towards said other side edge, longitudinally extending tabs on the ends of said body with the tab on one end being on one side of a horizontal plane passing through the longitudinal axis of the body and the tab on the other end of the body being on the other side of said plane, there being transversely extending bores through said tabs for receiving connecting pins therein.

3. A roller bearing cage comprising a body, there being a recess in one side edge of said body for receiving an end of a roller, there being a dove-tailed groove in the other side edge of said body, longitudinally extending tabs on the ends of said body with the tab on one end being on one side of a horizontal plane passing through the longitudinal axis of the body and the tab on the other end of the body being on the other side of said plane, there being transversely extending bores through said tabs for receiving connecting pins therein.

4. A sliding roller bearing assembly comprising a plurality of bearing cages, each bearing cage comprising a body having a recess in one side edge thereof and a dove-tailed groove in the other side edge thereof with longitudinally extending tabs on the ends of said body with the tabs on one end being on one side of a horizontal plane passing through the longitudinal axis of the body and the tabs on the other end being on the other side of said planes and further there being transversely extending bores through said tabs, a pair of said cages arranged so that said recesses oppose each other, a roller having its ends received in said opposing recesses, connecting pins passing through the bores in the corresponding end tabs of said cages, and a connecting link having dove-tailed projections fitting into opposed dove-tail recesses of two pairs of laterally positioned pairs of cages.

5. A sliding roller bearing assembly comprising a plurality of bearing cages, each bearing cage comprising a body having a recess in one side edge thereof and a dove-tailed groove in the other side edge thereof with longitudinally extending tabs on the ends of said body with the tabs on one end being on one side of a horizontal plane passing through the longitudinal axis of the body and the tabs on the other end being on the other side of said planes and further there being transversely extending bores through said tabs, a pair of said cages arranged so that said recesses oppose each other, a roller having its ends received in said opposing recesses, connecting pins passing through the bores in the corresponding end tabs of said cages, and a connecting link having dove-tailed projections fitting into opposed dove-tail recesses of two pairs of laterally positioned pairs of cages, said dove-tailed projections being at angles with respect to each other so that the rollers of the laterally positioned pairs of cages are at an angle with respect to each other.

6. A sliding roller bearing assembly comprising a plurality of bearing cages, each bearing cage comprising a body having a recess in one side edge thereof and a dove-tailed groove in the other side edge thereof with longitudinally extending tabs on the ends of said body with the tabs on one end being on one side of a horizontal plane passing through the longitudinal axis of the body and the tabs on the other end being on the other side of said planes and further there being transversely extending bores through said tabs, a pair of said cages arranged so that said recesses oppose each other, a roller having its ends received in said opposing recesses, connecting pins passing through the bores in the corresponding end tabs of said cages, and a connecting link having dove-tailed projections fitting into opposed dove-tail recesses of two pairs of laterally positioned pairs of cages, said connecting link composed of plastic with a bendable metal insert therein so that said link can be bent to any desired angle.

References Cited in the file of this patent

UNITED STATES PATENTS 818,919   Scheiffler _____ Apr. 24, 1906

FOREIGN PATENTS 707,198   Great Britain _____ Apr. 14, 1954
799,126   Great Britain _____ July 30, 1958